United States Patent

Friedmann et al.

[11] Patent Number: 5,725,447
[45] Date of Patent: Mar. 10, 1998

[54] POWER TRAIN WITH INFINITELY VARIABLE RATIO TRANSMISSION

[75] Inventors: Oswald Friedmann, Lichtenau; Urban Panther, Seelbach; Ivo Agner, Bad Homburg, all of Germany

[73] Assignee: LuK Getriebe-Systeme GmbH, Bühl/Baden, Germany

[21] Appl. No.: 572,536

[22] Filed: Dec. 14, 1995

[30] Foreign Application Priority Data

Dec. 15, 1994 [DE] Germany ............ 44 44 648.9
Dec. 21, 1994 [DE] Germany ............ 44 45 648.4

[51] Int. Cl.[6] .................................................. F16H 59/00
[52] U.S. Cl. ........................................... 474/18; 474/28
[58] Field of Search ........................ 474/18, 28, 69; 137/625.65

[56] References Cited

U.S. PATENT DOCUMENTS

| | | | |
|---|---|---|---|
| 4,229,988 | 10/1980 | Rattunde | 474/28 |
| 4,261,213 | 4/1981 | Rattunde. | |
| 4,616,675 | 10/1986 | Amrhein | 137/625.65 |
| 4,714,451 | 12/1987 | Yoshida et al. | 474/28 |
| 4,722,718 | 2/1988 | Eugen. | |
| 4,798,561 | 1/1989 | Hattori | 474/28 |
| 5,046,991 | 9/1991 | Friedmann. | |
| 5,169,365 | 12/1992 | Friedmann. | |
| 5,217,412 | 6/1993 | Indlekofer et al.. | |
| 5,295,915 | 3/1994 | Friedmann. | |

FOREIGN PATENT DOCUMENTS

| | | | |
|---|---|---|---|
| 0076552 | 4/1983 | European Pat. Off. | 474/28 |
| 2033502 | 5/1980 | United Kingdom | 474/28 |

*Primary Examiner*—Roger J. Schoeppel
*Attorney, Agent, or Firm*—Darby & Darby

[57] ABSTRACT

A torque transmitting power train for use in a motor vehicle employs a transmission with two adjustable pulleys and an endless flexible element trained over the pulleys. The pulleys are adjustable by a torque sensor and primary hydraulic adjusting units in dependency upon the magnitude of transmitted torque, as well as by an adjustable selecting valve and secondary hydraulic adjusting units in dependency upon the desired or required transmission ratio. The primary and secondary adjusting units can receive a pressurized hydraulic fluid from a common source.

39 Claims, 4 Drawing Sheets

POWER TRAIN WITH INFINITELY VARIABLE RATIO TRANSMISSION

BACKGROUND OF THE INVENTION

The present invention relates to improvements in power trains, especially for use in motor vehicles, and more particularly to improvements in power trains of the type employing infinitely variable speed ratio transmissions. Still more particularly, the invention relates to improvements in power trains of the type wherein the transmission constitutes or includes a so-called variator wherein a first axially adjustable sheave, pulley or sprocket wheel can receive torque from a prime mover, such as the combustion engine of a motor vehicle, and can transmit torque to a second axially adjustable sheave, pulley or sprocket wheel by way of an endless flexible element (such as a chain or a belt) which is trained over the two sheaves, pulleys or sprocket wheels. For the sake of simplicity and brevity, the endless flexible element will be referred to as a chain and the sheaves, pulleys or sprocket wheels will be referred to as pulleys.

It is already known to provide an infinitely variable ratio transmission of the above outlined character with a first adjusting unit for the first pulley, with a second adjusting unit for the second pulley, and with a hydromechanical torque monitoring device or sensor which regulates the operation of the adjusting units in dependency on the pressure of a fluid medium (such as oil). The pressure of fluid which is being used to operate the pulleys varies as a function of the magnitude of torque being transmitted by the power train. The first pulley is adjustable in order to select the force with which its tapering discs engage the adjacent looped portion of the chain, and the second pulley is adjustable in order to select the force with which its tapering discs engage the adjacent looped portion of the chain. Such forces determine the magnitude of torque which the chain transmits between the first and second pulleys. The first pulley can be driven by a drive shaft or input shaft which receives torque from the prime mover, e.g., by way of the torque sensor, and the second pulley can drive a driven shaft or output shaft which, in turn, can transmit torque to the wheels of a motor vehicle, e.g., by way of a suitable differential.

The torque sensor can be provided with a plenum chamber which receives pressurized fluid from a pump or another suitable source. An outlet of the torque sensor can be controlled by a regulating valve which can be constructed and assembled in such a way that it comprises at least two components which are movable (e.g., turnable and/or axially movable) relative to each other to an extent determined at least by the magnitude of the transmitted torque, and the pressure of fluid leaving the plenum chamber of the torque sensor is utilized for the actuation of the adjusting units which control the clamping action between the discs of the respective pulleys and the adjacent looped portions of the chain.

It is also known to equip a power train of the above outlined character with additional or secondary adjusting units which can influence the clamping action between the pulleys and the chain in dependency on at least one additional variable, particularly the selected speed ratio of the infinitely variable transmission. The secondary adjusting units operate in parallel with the respective first and second adjusting units, namely the adjusting units (hereinafter called primary adjusting units) which can select the clamping action in dependency on the magnitude of transmitted torque. Transmissions of the above outlined character are disclosed, by way of example, in published German patent applications Nos. 40 36 683, 42 34 294, 42 01 692, 40 36 722 and 41 34 658 as well as in pending German patent application Ser. No. 4 443 332.8. The torque sensors which are disclosed in four of the above enumerated German patent applications are designed to generate pressure which is to be utilized for selection of the extent of clamping engagement between the pulleys and the chain merely in dependency upon the magnitude of the transmitted torque. On the other hand, the torque sensors which are disclosed in the published German patent application No. 42 34 294 and in the pending German patent application Ser. No. 4 443 332.8 are designed to generate a pressure for the application of a clamping force depending not only upon the transmitted torque but also upon the selected speed ratio of the transmission. Such dual-purpose torque monitoring devices or sensors can be said to act as valves which are regulated in dependency upon the torque as well as a function of the selected ratio of the infinitely variable ratio speed transmission.

Figure 1:
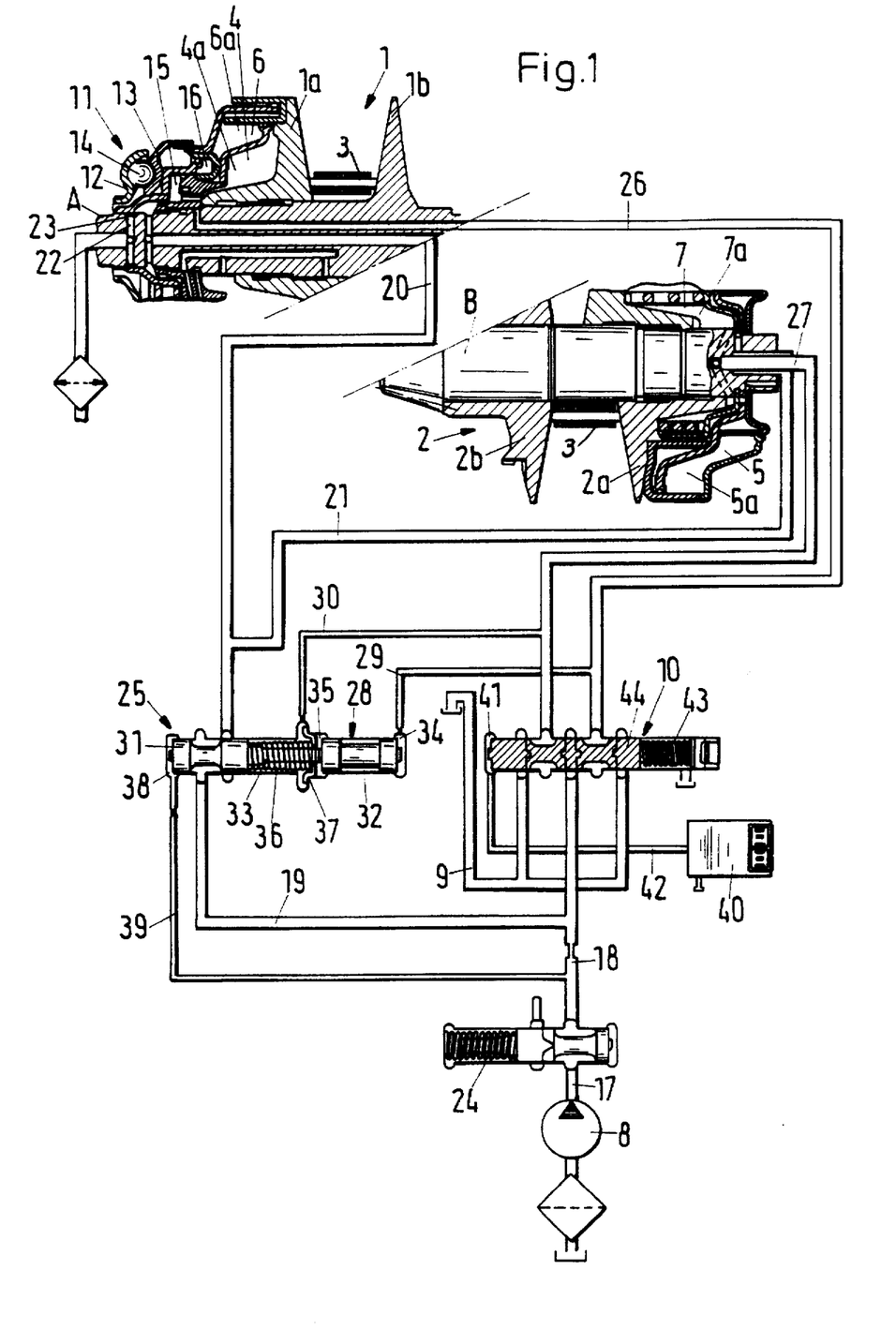
FIG. 1 is a fragmentary partly elevational and partly axial sectional view of a power train which embodies one form of the invention and employs a first transmission ratio selecting valve.
Figure 2:
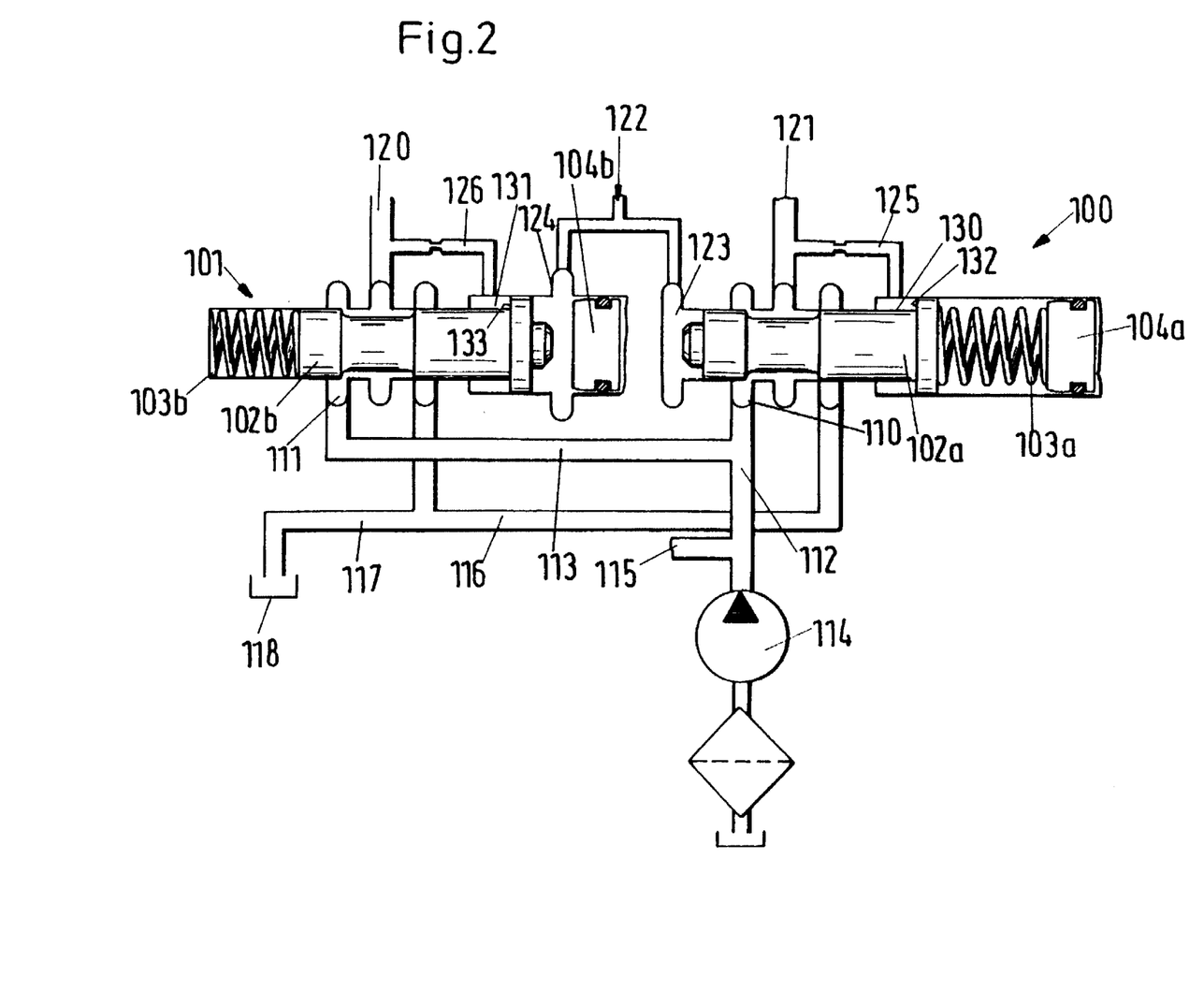
FIG. 2 is an enlarged schematic sectional view of a modified transmission ratio selecting valve.

FIG. 1 of the aforesaid published German patent application No. 40 36 683 shows a transmission wherein only one of the two axially adjustable pulleys is associated with a primary adjusting unit as well as with a secondary adjusting unit. The primary adjusting units for the two pulleys receive pressurized fluid from a first pump, and the single secondary adjusting unit (which serves to adjust the corresponding pulley as a function of the selected transmission speed ratio) is designed to receive pressurized fluid from a second pump. The single secondary adjusting unit cooperates with the first primary adjusting unit. In such transmissions, the second primary adjusting unit must be equipped with an energy storing device, e.g., with a diaphragm spring, which permanently urges the discs of the second pulley axially toward each other, i.e., into clamping engagement with the adjacent looped portion of the chain. In other words, the energy storing device opposes the adjusting force which the secondary adjusting unit applies to the discs of the first pulley. FIG. 2 of the published German patent application No. 40 36 683 shows a power train wherein a secondary adjusting unit is provided for each of the two axially adjustable pulleys and, again, the secondary adjusting units must receive pressurized fluid from a discrete second pump, i.e., a pump other than that connected or connectable with the plenum chamber of the torque sensor. All this contributes to the bulk, initial and maintenance cost as well as energy requirements of the aforediscussed power trains.

The disclosures of the commonly owned copending patent applications Ser. Nos. 08/572,538 (filed Dec. 14, 1995 by Oswald Friedmann for "Power train") and 08/568,134 (filed Dec. 6, 1995 by Oswald Friedmann and Armin Veil for "Torque monitoring apparatus") are incorporated herein by reference.

OBJECTS OF THE INVENTION

An object of the invention is to provide a power train which employs an infinitely variable speed transmission of the type known as variator and is simpler than but at least as versatile as heretofore known power trains.

Another object of the invention is to provide novel and improved controls for the primary and secondary adjusting units which are utilized in or in conjunction with the transmission of the improved power train.

A further object of the invention is to provide a motor vehicle embodying a power train of the above outlined character.

An additional object of the invention is to provide a novel and improved system of valves for use in the above outlined power train.

Still another object of the invention is to provide a novel and improved combination of fluid-operated adjusting units and valves for use in the above outlined power train which can be installed with advantage in motor vehicles.

A further object of the invention is to provide a novel and improved combination of a hydromechanical torque monitoring device or sensor and valves for use in the above outlined power train Another object of the invention is to provide a novel and improved method of operating an infinitely variable speed ratio transmission in a power train of the above outlined character.

An additional object of the invention is to provide novel and improved valves for use in the above outlined power train.

Still another object of the invention is to provide a power train which constitutes an improvement and a further development of power trains disclosed in the aforementioned and aforediscussed published and unpublished German patent applications.

SUMMARY OF THE INVENTION

One feature of the present invention resides in the provision of a power train, particularly for use in motor vehicles, which comprises an infinitely variable ratio transmission of the type including an input portion having a first adjustable pulley, an output portion having a second adjustable pulley, an endless torque transmitting element trained over the pulleys, and first and second primary adjusting units which serve to determine the extent of torque transmitting engagement between the endless flexible element and the respective pulleys. The primary adjusting units are actuatable by a fluid (such as oil) at a pressure which is variable at least as a function of torque to be transmitted by the transmission. The means for generating such pressure includes a hydromechanical torque sensor which is arranged to transmit at least a portion of torque to one of the input and output portions and includes a plenum chamber serving to receive pressurized fluid from a source and having an outlet. The torque sensor further comprises a regulating valve for controlled evacuation of fluid from the plenum chamber by way of the outlet, and such regulating valve comprises at least two components (e.g., in the form of cam discs) which are movable relative to each other in dependency upon the magnitude of torque being applied between the input and output portions to maintain the fluid in the plenum chamber at a pressure which is a function at least of the applied torque and which is transmittable to the primary adjusting units. The power train further comprises means for changing the transmission ratio of the infinitely variable speed ratio transmission, and such ratio changing means includes an additional or secondary adjusting unit for at least one of the pulleys. The additional adjusting unit is arranged to operate in parallel with the respective primary adjusting unit and to receive fluid from the aforementioned source, and the power train further comprises a transmission ratio selecting valve which is connected between the source and the additional or secondary adjusting unit, as well as a pressure regulating valve which is connected between the source and the plenum chamber in parallel with the transmission ratio selecting valve to influence the pressure of fluid at least at an inlet of the transmission ratio selecting valve.

The source can comprise a pump which is common to the torque sensor and to the at least one additional or secondary adjusting unit.

The pressure of fluid in the plenum chamber of the torque sensor can be sufficient to effect a change of the transmission ratio at a predetermined speed (i.e., within a desired interval of time) under certain predetermined circumstances of operation of the power train (e.g., in a motor vehicle); the arrangement can be such that the pressure regulating valve of the power train remains open or is opened under such predetermined circumstances. However, the pressure regulating valve can remain partially or fully closed (or is caused to become closed) when the pressure in the plenum chamber of the torque sensor is incapable of effecting a desired change of the transmission ratio at a predetermined speed (i.e., within a predetermined interval of time) under certain other (preselected) circumstances of operation of the power train.

The transmission ratio changing means can include an additional or secondary adjusting unit for each of the first and second pulleys.

The mode of operation of the improved power train can be such that the fluid pressure at the inlet of the ratio selecting valve rises, in response to closing of the pressure regulating valve, above the pressure which is generated by the torque sensor.

The inlet of the ratio selecting valve is connected to the source of pressurized fluid by a conduit and/or in any other suitable way, and the ratio selecting valve can be further provided with an outlet which is connected with the additional or secondary adjusting unit. The pressure of fluid at the inlet of the ratio selecting valve during a variation of the transmission ratio can be higher than a maximum fluid pressure for the additional or secondary adjusting unit at the outlet of the ratio selecting valve.

The ratio selecting valve can constitute a hydraulically regulatable valve. For example, the ratio selecting valve can be regulated by a suitable proportioning valve.

The pressure regulating valve can be designed and installed in such a way that it can maintain the fluid pressure at the inlet of the ratio selecting valve above a predetermined minimum value.

The pressure regulating valve can include a valving element (e.g., a spool) which is axially reciprocable in a valve housing or body back and forth in first and second directions, and means (e.g., a coil spring) for at least mechanically biasing the valving element in one of the first and second directions. The valving element is movable in the other of the first and second directions by fluid which is maintained at a pressure corresponding to the pressure of fluid between the source, the inlet of the ratio selecting valve and an inlet of the pressure regulating valve. Furthermore, the valving element can be biased in the one direction by a fluid-pressure-dependent force acting in parallel with the mechanical bias in the one direction. The aforementioned force is dependent upon at least one fluid pressure which is established between the ratio selecting valve and an adjusting element which serves to vary the transmission ratio.

As already mentioned hereinabove, the transmission ratio changing means can comprise an additional or secondary adjusting unit for each of the first and second pulleys, and such transmission ratio changing means further comprises conduits or like parts which connect the source with the additional or secondary adjusting units. Such power train can further comprise a suitable OR-member which is arranged to apply fluid pressure prevailing in both conduits to actuate the pressure regulating valve. The OR-member can be designed to exert upon a reciprocable valving element (such as a spool) of the pressure regulating valve a force which acts in parallel with a force generated by an energy storing device in a direction to close the pressure regulating valve.

It is also possible to emloy an OR-member which includes a further valve having a valve body defining two inlets (e.g., in the form of ports) and an outlet, and a substantially spherical valving element which is confined in the valve body and serves to seal one of the two inlets when the pressure of fluid at the one of the two inlets is less than the pressure of the fluid at the other of the two inlets. The OR-member can also comprise a valve having a substantially spherical mobile valving element.

The OR-member can comprise a valve including a mobile valving element and two compartments flanking the valving element. The primary adjusting units can be provided with suitably shaped plenum chambers each of which communicates with a different one of the two compartments. The valving element can include or constitute a reciprocable plunger.

The ratio selecting valve can comprise or constitute a 4/3-way valve.

Furthermore, the ratio selecting valve can comprise a plurality of discrete valves, particularly two discrete valves. Common regulating means can be provided for the plurality of valves which together constitute or form part of the ratio selecting valve. If the transmission ratio changing means comprise a discrete additional or secondary adjusting unit for each of the pulleys, the fluid pressure in each of the secondary adjusting units can be regulated by a discrete valve of the plurality of valves forming part of or constituting the ratio selecting valve. At least one of the plurality of valves can constitute a feedback valve, e.g., a pressure reducing feedback valve.

It is further possible to construct and assemble the ratio selecting valve in such a way that it comprises a valve body or housing and a valving element (such as a piston, plunger or spool) which is axially reciprocable in the valve body in first and second directions between a plurality of positions and includes portions having different radii and being spaced apart from each other in the axial direction of the valve body. Such ratio selecting valve can further comprise mechanical means (e.g., one or more coil springs) for biasing the valving element in one of the first and second directions. The aforementioned portions of the valving element can be acted upon by fluid-generated axial forces in addition to the bias of the mechanical means. The valving element can be provided with at least two shoulders which are disposed between the portions of different radii and have different areas. Such shoulders face in opposite axial directions and can be acted upon by hydraulic forces of different magnitude. In accordance with one presently preferred embodiment, the valving element includes a portion at which the radius of the valving element is changed as a result of the provision of a shoulder adapted to be acted upon by fluid pressure in the axial direction of the valving element, and the valving element has a fluid-containing preferably axial passage for a second reciprocable valving element. The fluid pressure in the passage upon the axially reciprocable valving element of the ratio selecting valve is proportional to the cross-sectional area of the passage. The axial length of the axially reciprocable valving element (namely of the valving element which is provided with the preferably axial passage) exceeds the axial length of its passage. The fluid pressure can act upon the axially reciprocable valving element in the first direction and the fluid-generated axial forces then act upon the axially reciprocable valving element in the second direction.

The pressure regulating valve can constitute, form part of or include a 2/2-way valve.

The torque sensor can be constructed, installed and operated in such a way that it transmits the entire torque to one of the input and output portions.

Another feature of the present invention resides in the provision of a power train, particularly for use in motor vehicles, which comprises a variable speed ratio transmission, preferably an infinitely variable transmission of the previously outlined character, and means for varying the ratio of the transmission. The means for varying the ratio of the transmission comprises a ratio selecting valve having a valve housing or body and a valving element which is axially reciprocable in the valve body in first and second directions between a plurality of different positions and includes portions having different radii and being spaced apart from each other in the axial direction of the valve body. The valve further comprises mechanical means for biasing the valving element in one of the first and second directions. The aforementioned portions of the valving element can be acted upon by fluid-generated axial forces in addition to the bias of the mechanical means. The valving element can be provided with at least two shoulders which are disposed between the portions having different radii and have different areas. The shoulders face in opposite axial directions and can be acted upon by hydraulic forces of different magnitude. In accordance with one presently preferred embodiment, the valving element includes a portion at which its radius is changed as a result of the provision of a shoulder adapted to be acted upon by fluid pressure in the axial direction of the axially reciprocable valving element. Such valving element can be provided with a preferably axial passage for a second reciprocable valving element, and the pressure of fluid in the passage upon the axially reciprocable valving element is or can be proportional to the cross-sectional area of the passage. The axial length of the passage can be less than the axial length of the axially reciprocable valving element. The mode of operation of the means for varying the ratio of the transmission can be such that the axially reciprocable valving element is acted upon by fluid pressure in the first direction and that such axially reciprocable valving element is acted upon by fluid-generated axial forces in the second direction.

The novel features which are considered as characteristic of the invention are set forth in particular in the appended claims. The improved power train itself, however, both as to its construction and its mode of operation, together with additional features and advantages thereof, will be best understood upon perusal of the following detailed description of certain presently preferred specific embodiments with reference to the accompanying drawings.

BRIEF DESCRIPTION OF THE DRAWINGS

FIG. 5b is a fragmentary sectional view substantially as seen in the direction of arrows from the line A—A in FIG. 5a; and FIG. 5c is a fragmentary sectional view substantially as seen in the direction of arrows from the line B—B in FIG. 5a.

DESCRIPTION OF PREFERRED EMBODIMENTS

FIG. 1 illustrates a portion of a power train which can be put to use in a motor vehicle and comprises an infinitely variable ratio transmission or variator. The latter includes an input portion with a first axially adjustable pulley 1 having tapered discs 1a, 1b mounted on an input shaft or drive shaft A in such a way that they cannot rotate relative to the shaft but the disc 1a is movable axially toward and away from the disc 1b. The transmission further includes an output portion including a second pulley 2 having tapered discs 2a, 2b non-rotatably mounted on an output shaft or driven shaft B in such a way that the disc 2a is movable axially toward and away from the disc 2b. Still further, the transmission comprises an endless flexible element 3 (such as a suitable chain) which is trained over and serves to transmit larger or smaller torques between the pulleys 1 and 2.

The disc 1a is movable axially toward and away from the disc 1b by a hydraulically operated first primary adjusting unit 4 which can constitute a cylinder and piston assembly and defines a plenum chamber or cylinder chamber 4a. A similar second primary adjusting unit 5 in the form of a cylinder and piston assembly is provided to move the disc 2a axially toward and away from the axially fixed disc 2b of the output portion. The adjusting unit 5 defines a plenum chamber or cylinder chamber 5a. The selected clamping action between the discs 1a, 1b of the pulley 1 and the adjacent looped portion of the chain 3 determines the magnitude of torque which is transmittable between the input shaft A and the chain 3, and the selected clamping action between the discs 2a, 2b of the pulley 2 and the chain 3 determines the magnitude of torque which can be transmitted between the chain 3 and the output shaft B.

The power train further comprises a first secondary or additional adjusting unit 6 for the disc 1a of the pulley 1, and a second secondary or additional adjusting unit 7 for the disc 2a of the pulley 2. The secondary adjusting units 6, 7 operate in parallel with the respective primary adjusting units 4,5, and each secondary adjusting unit can also constitute a cylinder and piston assembly. The plenum chambers or cylinder chambers of the secondary adjusting units 6, 7 are shown at 6a and 7a, respectively.

The secondary adjusting units 6 and 7 form part of the means for changing the speed ratio of the transmission. Such speed ratio is changed in response to changes of the pressure of hydraulic fluid medium (such as oil) in the cylinder chambers 6a and 7a. Each of the chambers 6a, 7a has an inlet for admission of pressurized fluid (hereinafter called oil for short) and an outlet for evacuation of such fluid. The source of pressurized oil is a pump 8 which can supply oil to the cylinder chamber 6a and/or to the cylinder chamber 7a. If a change of the speed ratio is desired or necessary, the volume of one of the cylinder chambers 6a, 7a is increased while the other of these cylinder chambers is caused to reduce its volume by discharging a certain quantity of oil. The admission of oil into and the evacuation of oil from the cylinder chambers 6a, 7a takes place by way of a transmission ratio selecting valve or selector valve 10 which is installed in the path of oil flow between the pump 8 and the secondary adjusting units 6, 7.

The improved power train still further comprises a torque monitoring device or sensor 11 which serves to generate a pressure that is variable at least as a function of torque. The illustrated torque sensor 11 is a hydromechanically operated device and is installed in such a way that it transmits the entire torque (such as that furnished by the output element of a combustion engine in a motor vehicle) to the input portion of the transmission, namely to the pulley 1. A first component 12 of the torque sensor 11 is mounted on the shaft A with limited freedom of angular movement relative to the shaft, and a second component 13 of the sensor 11 is movable in the axial direction of the shaft A. Each of the components 12, 13 forming part of the illustrated sensor is a cam disc having sloping ramps which confront complementary ramps on the other cam disc. The torque sensor 11 further comprises spherical spreading elements 14 which are installed between the two cam discs 12, 13. The cam disc 13 is held against rotation relative to the shaft A.

The torque sensor 11 has a plenum chamber 15 which can receive oil from the pump 8 by way of conduits 18, 19 and 20. The pressure of oil in the plenum chamber 15 is modulated at least as a function of the magnitude of transmitted torque and is being transmitted to oil in the cylinder chamber 4a and/or 5a (i.e., to at least one of the primary adjusting units 4, 5) in order to determine the extent of frictional clamping action between the conical discs of the pulley 1 and/or 2 and the adjacent looped portion(s) of the chain 3. A further conduit 21 branches from the conduit 20 to deliver pressurized oil to the cylinder chamber 7a of the second secondary or additional adjusting unit 7 (for the pulley 2). The plenum chamber 15 of the torque sensor 11 is connected with the cylinder chamber 4a of the primary adjusting unit 4 for the pulley 1 by way of at least one bore, channel and/or an analogous passage or path.

The just mentioned passage or path establishes a permanent communication between the plenum chamber 15 of the torque sensor 11 and the cylinder chamber 4a of the first primary adjusting unit 4. The plenum chamber 15 has one or more outlets adapted to be established by at least one at least substantially radial channel 22 which is provided in the shaft A and communicates or can be caused to communicate with the plenum chamber 15. Oil which leaves the plenum chamber 15 of the torque sensor 11 by way of the illustrated channel 22 is caused to flow through a valve 23 which constitutes a flow restrictor, and such oil can be put to use as a cooling and/or lubricating medium in one or more parts of the power train, e.g., in the aforediscussed transmission, in a friction clutch or the like.

The valve 23 includes that portion of the shaft A which defines the radially outer part of the channel 22 and the adjacent portion of the cam disc 13 which latter (as already mentioned above) is movable axially of the shaft A between a plurality of different positions relative to the cam disc 12. The extent to which the cam disc 13 seals the adjacent oil receiving radially outer portion of the channel 22 depends at least upon the magnitude of the applied torque, namely the torque being transmitted between the cam discs 12, 13 of the torque sensor 11. The extent to which the cam disc 13 of the torque sensor 11 seals the adjacent radially outer portion of the channel 22 determines the pressure of oil in the plenum chamber 15 (such oil is supplied by the pump 8) so that the pressure of oil in the chamber 15 is indicative at least of the magnitude of the torque being transmitted between the cam discs 12 and 13.

The plenum chamber 15 of the torque sensor 11 further communicates with the cylinder chamber 5a of the second primary adjusting unit 5, namely by way of the conduits 20 and 21, i.e., the pressure of oil in the cylinder chambers 4a, 5a corresponds to that in the plenum chamber 15.

Since the primary adjusting units 4, 5 operate in parallel with the respective secondary adjusting units 6, 7, the forces with which the pulleys 1,2 engage the adjacent portions of the chain 3 due to the pressure of oil prevailing in the plenum chamber 15 and the cylinder chambers 4a, 5a are added to forces with which the discs 1a, 2a are caused to bear against the adjacent portions of the chain 3 due to oil pressure prevailing in the cylinder chambers 6a, 7a of the respective secondary adjusting units 6 and 7. As already explaned hereinbefore, the secondary adjusting units 6, 7 form part of the means for changing the ratio of the transmission including the pulleys 1, 2 and the chain 3, namely for selecting a desired transmission ratio or for altering the existing transmission ratio.

The torque sensor 11 has a second plenum chamber 16 in parallel with the plenum chamber 15. The plenum chambers 15, 16 are communicatively connected to or sealed from each other in dependency upon changes of the speed ratio of the infinitely variable speed transmission including the pulleys 1, 2 and the chain 3. The establishment or interruption of communication between the plenum chambers 15, 16 is determined by the axial position of the disc 1a forming part of the pulley 1 on the shaft A. Thus, the disc 1a can be said to constitute a mobile element of a valve which is installed between the plenum chambers 15, 16 of the torque sensor 11 to control the flow of oil between these plenum chambers along one or more paths defined by channels, grooves, bores and/or analogous passages in the shaft A and/or in the parts of the pulley 1.

It is preferred to select the operation of the valve including the axially movable disc 1a of the pulley 1 on the shaft A in such a way that only the first plenum chamber 15 can be filled with pressurized oil within at least the major part of that range of the transmission ratio when the transmission is set to drive its output portion at an RPM less than that of the input portion, i.e., when the transmission acts as a step-down transmission. Furthermore, communication between the plenum chambers 15, 16 of the torque sensor 11 can be established, in accordance with a presently preferred embodiment, at least substantially during transition from operation of the transmission as a step-down transmission to operation as a step-up transmission. Otherwise stated, the establishment of communication between the plenum chambers 15, 16 can take place when the transmission ratio is or at least approximates 1:1.

It will be seen that, in addition to being capable of modulating the pressure of oil as a function of the magnitude of transmitted torque, the aforedescribed torque sensor 11 is further capable of modulating such oil pressure in dependency upon the transmission ratio. In the embodiment of FIG. 1, the torque sensor 11 can be said to be capable of carrying a two-stage transmission-ratio-dependent modulation of pressure or pressure level.

When the plenum chambers 15, 16 are sealed from each other, i.e., when the transmission acts as an underdrive to drive the shaft B at an RPM less than that of the shaft A, the axial force between the cam discs 12, 13 of the torque-sensor 11 is being transmitted exclusively by an axially effective surface in the plenum chamber 15, and such situation preferably prevails within the entire range of transmission ratios when the transmission acts as an underdrive.

On the other hand, when the transmission acts as an overdrive to rotate the shaft B at an RPM higher than that of the shaft A, the axial force which is being generated between the cam discs 12, 13 of the torque sensor 11 is being taken up by the axially effective surfaces in the plenum chambers 15 and 16, and this preferably takes place at least within the major part of the range when the transmission acts as an overdrive. Otherwise stated, and assuming that the input torque remains the same, the pressure set up by the torque sensor 11 when the transmission acts as an underdrive is higher than when the transmission acts as an overdrive. As already pointed out above, the transmission can be designed in such a way that the switchover point, namely the establishment or termination of communication between the plenum chambers 15 and 16, takes place at a transmission ratio of at least close to 1:1.

Regarding numerous additional features and the mode of operation of a variator-style transmission having two pulleys and an endless flexible element and cooperating with a torque sensor such as the torque sensor 11 shown in FIG. 1, reference may be had to the aforementioned German patent application Ser. No. 4 443 332.8 and to the corresponding applications filed in other countries. The German patent application Ser. No. 4 443 332.8 further describes and shows additional embodiments of torque sensors which can be utilized in conjunction with transmissions of the type shown in FIG. 1. Still further, it is possible to utilize the transmission of FIG. 1 in combination with torque sensors of the type disclosed in the aforementioned published German patent applications and/or in corresponding patent applications (or granted patents) filed in countries other than Federal Republic Germany. Though it is possible to utilize single-stage torque sensors, it is believed to be desirable for the efficiency of the transmission if the power train is designed in such a way that (and as already described hereinbefore) one can resort at least to a two-stage or a multistage (higher than two-stage) or even an infinitely variable modulation of the fluid pressure in dependency upon the transmission ratio or a change of the transmission ratio.

An advantage of the power train which is shown in FIG. 1 is that a single source (pump 8) suffices to supply oil to the torque sensor 11 as well as to the primary adjusting units 4, 5 and secondary adjusting units 6, 7. A conduit 17 connects the outlet of the pump 8 with a volumetric flow control valve 24 having an outlet connected with an inlet of the transmission ratio selecting valve 10 by way of the conduit 18. The flow control valve 24 is optional; for example, such valve can be dispensed with if the pump 8 constitutes a device which can supply pressurized oil at a plurality of different rates.

A pressure regulating valve 25 of the novel power train is installed between the conduits 19 and 20, i.e., between the pump 8 and the volumetric flow control valve 24 on the one hand, and the torque sensor 11 on the other hand. The purpose of the valve 25 is to raise the pressure of oil upstream of the valve 10, namely in the conduits 18 and 19. The valve 25 regulates the pressure of oil in the conduit 19 (and hence upstream of the valve 10) in such a way that this pressure exceeds the required higher one of the working pressures in the conduits 26, 27 which respectively serve to connect the valve 10 with the secondary adjusting units 6 and 7.

The conduit 20 connects an outlet of the pressure regulating valve 25 with the torque sensor 11 and with the first primary adjusting unit 4, and the conduit 21 connects the conduit 20 (and hence the outlet of the valve 25) with the second primary adjusting unit 5. However, it is not always necessary that the cylinder chamber 4a of the first primary adjusting unit 4 be connected with the outlet of the valve 25 by way of the torque sensor 11.

The oil pressure applied or prevailing in the conduits 20, 21 and hence in the cylinder chambers 4a, 5a depends upon the pressure supplied by the torque sensor 11, i.e., upon the torque which is being transmitted by the torque sensor. In order to ensure satisfactory operation of the transmission, it is desirable to maintain the oil pressure upstream of the valve 10 (i.e., in the conduits 18 and 19) above the pressure of oil in the conduits 26, 27, i.e., above that elevated pressure which is required in the cylinder chambers 6a, 7a in order to effect a change of the transmission ratio. The pressure which is required for a change of the transmission ratio can exceed the pressure which is being supplied by the torque sensor 11. In other words, the pressure which is made available by the torque sensor 11 under certain operating conditions (such as during certain stages of operation of a motor vehicle which embodies the improved power train) can be too low in order to ensure a sufficiently rapid change of the transmission ratio such as is desirable or necessary for proper operation of the vehicle. Otherwise stated, the pressure furnished by the torque sensor 11 might not always suffice to ensure that the change of transmission ratio is effected within a desired (relatively short) interval of time. For example, such a critical situation can develop during braking while the torque being transmitted by the engine of the vehicle is small, namely when the vehicle is decelerated within a short interval of time and, therefore, a desired change of the transmission ratio must also be completed within a short interval of time. At such times, the pressure supplied by the torque sensor 11 is relatively low because the torque sensor is called upon to transmit a relatively small torque which, as mentioned above, is not always likely to be sufficient to ensure a required or desired rapid (or even abrupt) change of the transmission ratio. The valve 25 responds under the just outlined circumstances by ensuring that the pressure upstream of the valve 10 (i.e., in the conduits 18, 19 and hence also in at least one of the conduits 26, 27) is sufficiently high for satisfactory operation of the power train. The pressure rise which is effected by the valve 25 prevails upstream of the torque sensor 11, i.e., in the conduits 20, 21 as well as upstream of the valve 10, i.e., in the conduit 19. The valve 25 thus ensures that the pressure in the conduit 19 exceeds, by a predetermined value, the higher of the pressures prevailing in the conduits 26, 27. To this end, the pressure regulating valve 25 comprises regulating means 28 designed to ensure the establishment of at least one flow restricting or throttling location between the conduits 19 and 20 whenever the circumstances (as described above) necessitate the establishment of such throttling action. As shown in FIG. 1, the regulating means 28 can be actuated or influenced by the establishment of a direct feedback of pressures prevailing in the conduits 26 and 27.

Direct feedback from the conduit 26 takes place by way of a conduit 29, and direct feedback from the conduit 27 takes place by way of a conduit 30. The regulating means 28 (which can be said to constitute an OR-member) is actually a transmission ratio varying adjusting element or valve. The valves 25, 28 of FIG. 1 have a common housing or body and respectively comprise axially reciprocable valving elements 31,32, e.g., in the form of spools, plungers or pistons. The valving elements 31, 32 are movable in the valve body independently of each other and are separated by a distancing member 33, e.g., a suitable pin. The valving element 32 is flanked by two plenum chambers or compartments 34, 35 which are respectively connected with the feedback conduits 29 and 30. The plenum chamber 35 is disposed between the valving elements 31, 32, as seen in the axial direction of the valve body which is common to the valves 25 and 28.

When the oil pressure in the conduit 27 (and hence also in the conduit 30) exceeds the pressure in the conduit 26, such pressure is felt in the plenum chamber 35 and is thus applied to the valving element 31 of the pressure regulating valve 25. On the other hand, if the pressure of oil in the conduit 26 (and hence also in the conduit 29) exceeds the pressure in the conduits 27 and 30, the pressure in the plenum chamber 34 suffices to effect an axial displacement of the valving element 32 whereby the distancing member 33 displaces the valving element 31 in the same direction, namely in a sealing or closing sense. It will be seen that the valve 28 clearly performs the function of an OR-member. Such OR-member, and more specifically its valving element 32, ensures that the valving element 31 of the pressure regulating valve 25 is always being acted upon by the higher one of the pressures prevailing in the conduits 26 and 27.

The composite valve including the valve 25 and the OR-member 28 further comprises a mechanical biasing device or energy storing device in the form of a coil spring 36 which is installed in the valve body in prestressed condition to operate between a dished retainer 37 (which, in turn, bears upon the valve body) and the reciprocable valving element 31 of the valve 25. The initial stressing of the coil spring 36 is selected in such a way that the pressure of oil in the conduit 19 (i.e., upstream of the transmission ratio selecting valve 10) cannot drop below a predetermined value. Otherwise stated, the pressure upstream of the valve 10 invariably exceeds zero pressure.

A further plenum chamber 38 is provided at that axial end of the valving element 31 which is remote from coil spring 36, and such plenum chamber is connected with the conduit 18 (and hence also with the conduit 19) by a further conduit 39. Thus, the pressure in the conduit 39 and in the chamber 38 of the valve 25 is the same as that in the conduits 18 and 19; this enables the oil in the chamber 38 to act upon the valving element 31 in a direction counter to the bias of the coil spring 36. The conduit 39 ensures that, as soon as the pressure of oil in the conduit 18 or 19 rises to the required minimum value, the valve 25 establishes a connection between the conduit 19 on the one hand and the conduits 20, 21 on the other hand. Thus, the pump 8 can furnish oil to the torque sensor 11.

The pressure regulating valve 25 can be said to act as a pressure comparing device because it actually compares the pressure in the conduits 18, 19 (i.e., upstream of the valve 10) with the higher of the pressures prevailing in the conduits 26 and 27. The position of the valving element 31 is indicative of the differential between the pressures at its axial ends. The spring 36 cooperates with the valve 25 and the OR-member or valve 28 to select the minimum oil pressure in the conduits 18 and 19 (i.e., upstream of the transmission ratio selecting valve 10) as well as the desired differential between the higher one of oil pressures in the conduits 26, 27 on the one hand and the oil pressure upstream of the valve 10 on the other hand.

The transmission selecting valve 10 can be actuated by a proportioning valve 40, i.e., the pressure of fluid in a conduit 42 connecting the proportioning valve 40 with a chamber 41 determines the axial position of a reciprocable valving element or spool 44 in a housing or body of the valve 10. In order to effect an axial displacement of the valving element 44 in a direction to the right (as viewed in FIG. 1), the oil pressure in the chamber 41 must overcome the resistance of a coil spring or another suitable mechanical biasing device or energy storing device 43 in the right-hand end portion of the body of the valve 10. When the pressure of oil in the chamber 41 is low, the spring 43 is free to dissipate at least some energy and to maintain the valving element 44 in an axial position such that the conduit 27 is free to communicate with a return or outlet conduit 9 which can discharge into the sump. At the same time, the valving element 44 enables the conduit 26 to communicate with the conduits 18, 19. Thus, the pressure in the conduit 27 is at least close to zero whereas the pressure in the conduit 26 at least approximates the maximum pressure as generated by the pump 8. This causes the valve 10 to ensure that the transmission can be set for acceleration (overdrive).

When the chamber 41 of the valve 10 receives pressurized fluid, the valving element 44 is shifted against the opposition of the spring 43, i.e., in a direction to the right as viewed in FIG. 1, to an extent which is a function of the fluid pressure in the chamber 41. When the pressure in the chamber 41 is increased to a maximum value, i.e., when the valving element 44 assumes its right-hand end position, the conduit 27 is free to communicate with the conduits 18, 19 and the conduit 26 is free to communicate with the evacuating conduit 9. Consequently, the pressure of oil in the conduit 27 rises to a maximum value and the pressure of oil in the conduit 26 is practically zero. This results in a change of the transmission speed ratio toward "underdrive". The oil pressures in the conduits 26, 27 need not always assume maximum or minimum values, i.e., appropriate adjustment of the valve 10 by the proportioning valve 40 renders it possible to select any desired number of intermediate pressures each of which corresponds to a different transmission ratio.

The proportioning valve 40 can be adjusted as a function of one or more parameters which are to select the pressure in the plenum chamber 41 and hence the axial position of the valving element 44 as well as the corresponding selection of the transmission ratio. For example, the valve 40 can be controlled by an electronic control system a portion of which is shown in FIG. 1. Such control system can process various parameters, such as particularly the ratio of the transmission, to furnish a corresponding input signal to the proportioning valve 40. For example, the actual or momentary tranmission ratio can be ascertained by employing signal generating implements which ascertain the RPM of the input shaft A and the RPM of the output shaft B. A comparison of signals from the two implements is indicative of the actual ratio of the transmission. Other parameters which might be considered in connection with the selection of fluid pressure in the chamber 41 of the valve 10 by way of the proportioning valve 40 include, for example, the position of the gas pedal in a motor vehicle (i.e., the quantity of fuel being admitted to the engine), the subatmospheric pressure in the intake manifold of the engine, the load upon the engine and/or others.

The valve 10 can constitute a so-called 4/3-way valve, e.g., a valve known as a square slide valve. However, it is equally within the purview of the invention to replace the illustrated hydraulically operated transmission ratio selecting valve with an electrically or pneumatically regulated magnetic valve. For example, it can be of advantage to employ an electromagnetically operated directional control valve, and such valve can also comprise one or more resilient biasing means corresponding to the coil spring 43 of the valve 10 shown in FIG. 1.

Still further, it is possible to employ one or more different valves not only in lieu of the transmission ratio selecting valve 10 but also in lieu of the illustrated volumetric flow control valve 24, in lieu of the pressure regulating valve 25 and/or in lieu of the illustrated valve 28 which constitutes the aforediscussed OR-member. Moreover, two or more of the valves 10, 24, 25, 28, 40 can be combined in one or more common valve bodies or housings, and one or more of these discrete valves can be replaced with pairs or larger groups of valves which together perform the function of the valve 10, 24, 25, 28 and/or 40. By way of eaxmple only, the valve 10 can be replaced with two valves, one between the conduit 26 and the conduits 18, 19 and the other between the conduit 27 and the conduits 18, 19. All that is then necessary is to provide adequate controls for the two valves which replace the valve 10.

FIG. 2 shows a composite transmission ratio selecting valve which includes two discrete slide valves 100, 101 having axially reciprocable valving elements or spools 102a, 102b, respectively. Each of the valving elements 102a, 102b is axially movably installed in a discrete valve housing or body. The valving element 102a is biased in a direction to the left, as viewed in FIG. 2, by a mechanical energy storing device 103a, and the valving element 102b is urged in a direction to the right by a smilar energy storing device or coil spring 103b. The right-hand end portion of the body for the valving element 102a is sealed by a plug 104a, and the coil spring 103a reacts against this plug to urge the valving element 102a in a direction toward the valving element 102b. The valving elements 102a, 102b and the coil springs 103a, 103b are introduced into the bodies of the valves 100, 101 prior to insertion of the respective plugs 104a, 104b. The valves 100, 101 respectively comprise inlet ports 110, 111 which are directly or indirectly connected with the outlet of a pump 114. FIG. 2 shows a supply conduit 112 leading from the outlet of the pump 114 to the inlet port 110, and a conduit 113 leading from the outlet of the pump 114 (and more specifically from the conduit 112) to the inlet port 111. If desired or necessary, the conduit 112 can contain a volumetric flow control valve corresponding to the valve 24 of FIG. 1.

The conduit 115 of FIG. 2 is a functional equivalent of the conduit 19 in the power train of FIG. 1. A conduit 116 connects an outlet port of the body of the valve 100 with a sump 118, and the latter is connected with an outlet port of the body of the valve 101 by a further conduit 117. The latter can include a portion common to the conduit 116. Those parts of the power train which include the two-piece transmission ratio selecting valve 100, 101 of FIG. 2 and are connected (during certain stages of operation of the power train) with the sump 118 do not contain any pressurized fluid, such as oil.

A conduit 120 connects the valve 101 with a primary adjusting unit of one of the pulleys (preferably with a primary adjusting unit corresponding to the unit 4 for the pulley 1 of FIG. 1), and a conduit 121 connects the valve 100 with the primary adjusting unit for the other pulley (preferably for a pulley corresponding to the pulley 2 in the transmission of FIG. 1).

Still another conduit 122 of FIG. 2 connects the two-piece transmission ratio selecting valve 100, 101 with a common regulating means such as a proportioning valve (not shown), i.e., the conduit 122 can be said to correspond to the conduit 42 shown in FIG. 1. The fluid pressure which is supplied by the proportioning valve via conduit 122 is comunicated to the fluid in the compartments or chambers 123, 124 of the respective valves 100, 101, and the fluid in the chambers 123, 124 acts upon the adjacent end faces of the respective valving elements 102a, 102b with a force which is selected by the proportioning valve. A first feedback conduit or return conduit 125 connects the conduit 121 with a plenum chamber 130 of the valve 100, and a second feedback conduit or return conduit 126 connects the conduit 120 with a plenum chamber 131 of the valve 101. The fluid pressure in the conduits 120, 121 is or can be a function of fluid pressure in the chambers 123, 124, respectively.

The springs 103a, 103b respectively urge the valving elements 102a, 102b to their starting or idle positions in which the pressure of fluid in the chambers 123, 124 is zero. If the chamber 123 receives pressurized fluid from the proportioning valve via conduit 122, the valving element 102a is shifted in a direction to the right to stress the coil spring 103a, and the admission of pressurized fluid from the proportioning valve via conduit 122 into the chamber 124 entails a shifting of the valving element 102b in a direction to the left to stress the coil spring 103b. While the coil spring 103b is free to maintain the valving element 102b in the axial position of FIG. 2, the pressure in the conduit 120 is zero because this conduit is then connected to the sump 118 via conduit 117 but the pressure in the inlet port 111 corresponds to the pressure at the outlet of the pump 114 (such pressure is communicated to the port 111 via conduits 112, 113).

FIG. 2 shows that the conduit 122 from the proportioning valve is in communication with the chambers 123 and 124, i.e., the two valving elements 102a, 102b are simultaneously moved axially and away from each other in immediate response to a rise of fluid pressure in the conduit 122 by way of the proportioning valve for the two-piece transmission ratio selecting valve 100, 101 of FIG. 2. Each such simultaneous shifting of the valving elements 102a, 102b in response to a change of fluid pressure in the conduit 122 and chambers 123, 124 entails a corresponding change of the ratio of the transmission embodying or cooperating with the structure of FIG. 2. Each of the valves 100, 101 constitutes a pressure reducing feedback valve (note the feedback or return conduits 125 and 126). When the conduit 125 causes the fluid pressure in the plenum chamber 130 to rise, such fluid acts upon the radially extending annular shoulder 132 in the chamber 130 and causes the valving element 102a to move toward the stop 104a, i.e., to assist the flid pressure in the chamber or compartment 123 in moving the valving element 102a against the opposition of the spring 103a. Analogously, when the feedback conduit 126 causes the fluid pressure to rise in the plenum chamber 131, such pressure acts upon the annular shoulder 133 of the valving element 102b so that the latter is caused to stress the coil spring 103b in dependency upon the pressures prevailing in the plenum chamber 131 as well as in the compartment or chamber 124.

Figure 3:
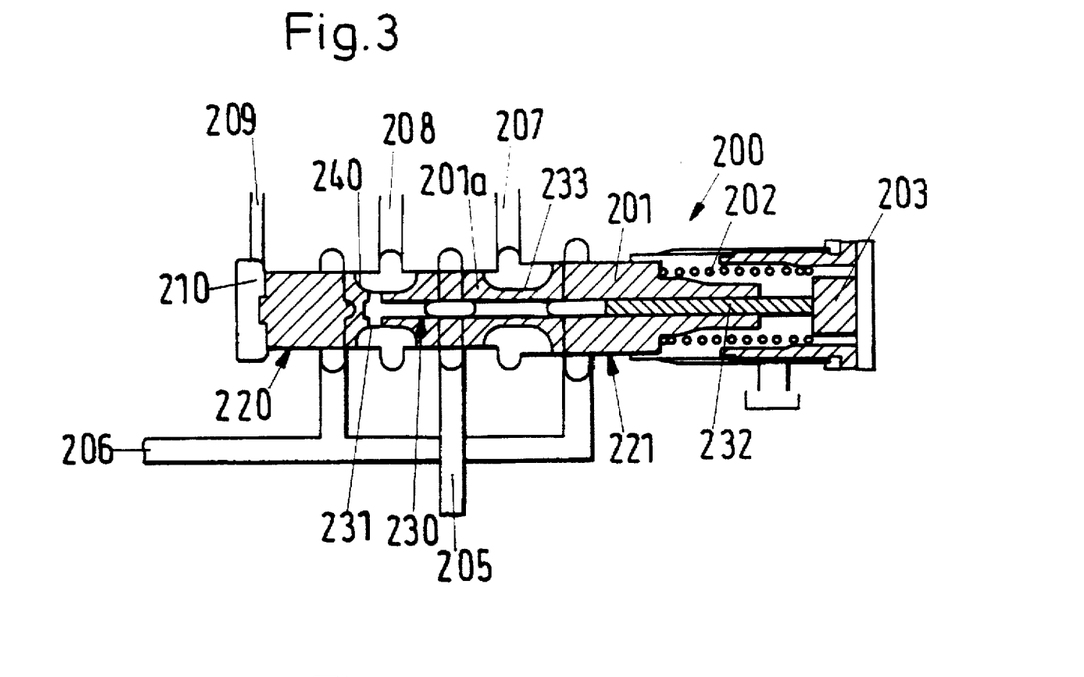
FIG. 3 is a schematic axial sectional view of a third transmission ratio selecting valve.

FIG. 3 shows a valve 200 which can be utilized in lieu of the ratio selecting valve 10 in the power train of FIG. 1 or in lieu of the two-piece ratio selecting valve 100, 101 of FIG. 2. The valve 200 also constitutes a feedback valve which comprises an elongated valve housing or body for an axially reciprocable valving element or spool 201. A mechanical device 202, here shown as a coil spring, is installed in the housing to urge the valving element 201 in a direction to the left, as viewed in FIG. 3, namely axially and away from a closure or stop 203 of the valve body or housing. The stop 203 is inserted into the valve body subsequent to introduction of the valving element 201 and coil spring 202. The latter reacts against the properly inserted stop 203.

The valve 200 is provided with a number of ports including one that is connected to a conduit 205 which is connected to the outlet of a pump (such as the pump 8 of FIG. 1 or the pump 114 of FIG. 2), either directly or by way of a fluid flow regulating valve corresponding to the valve 24 shown in FIG. 1. Two additional ports in the body of the valve 200 are connected to the sump (not shown) by an outlet conduit or evacuating conduit 206. The conduits 207 and 208 of FIG. 3 serve to connect the valve 200 with the first and second secondary adjusting units (corresponding to the adjusting units 6 and 7 shown in FIG. 1) of the infinitely variable ratio transmission or variator which cooperates with the valve 200. The conduit 207 is preferably connected with the secondary adjusting unit for the first pulley, and the conduit 208 is then connected with the secondary adjusting unit for the second pulley of the transmission.

A conduit 209 (corresponding, for example, to the conduit 42 shown in FIG. 1) is provided to admit pressurized fluid to a chamber or compartment 210 at the left-hand axial end of the valving element 201 in order to shift (when necessary) the valving element 201 in a direction to stress the coil spring 202. The proportioning valve which selects the fluid pressure in the conduit 209 (and hence in the chamber 210) is not shown in FIG. 3.

The valving element 201 includes several portions having different radii. Such portions include a portion 220 which has a relatively small diameter and is immediately adjacent the chamber 210, and a larger-diameter portion 221 which is adjacent the coil spring 202. The internal surface of the valve body is configurated in such a way that it includes portions snugly but slidably receiving the portions 220 and 221 of the valving element 201.

The valving element 201 is provided with an axial blind bore or passage or channel (hereinafter called bore) 230 (i.e., a bore having an axial length less than that of the valving element 201), and this bore receives a second reciprocable valving element 232 in the form of an elongated rod or bar abutting the stop 203 under the action of fluid pressure in the non-occupied left-hand portion of the bore 230. The valving element 201 is further provided with at least one radial bore or channel (hereinafter called channel) 231 which communicates with the bore 230 to the left of the valving element 232. The valving element 232 is slidably but preferably sealingly received in the bore 230.

The mode of operation of the transmission ratio selecting valve 200 of FIG. 3 is as follows: If the coil spring 202 is free to maintain the valving element 201 in an axial position to the left of that shown in FIG. 3, the conduit 206 is free to communicate with the conduit 208 leading to the secondary adjusting unit for one pulley of the infinitely variable ratio transmission (not shown in FIG. 3). At such time, the portion 240 of the valving element 201 permits fluid to flow from the conduit 208, through two neighboring ports of the valve body forming part of the valve 200, and into the sump via conduit 206. The valving element 201 then seals the conduit 207 (leading to the secondary adjusting unit for the other pulley of the transmission) from the conduits 205 and 206. The inlet of conduit 205 is then sealed by a substantially centrally located portion 201a of the valving element 201 which, as stated above, is assumed to be maintained in the left-hand end position (namely in a position to the left of that shown in FIG. 3) under the bias of the coil spring 202.

If the proportioning valve thereupon raises the fluid pressure in the chamber 210 by way of the conduit 209, the valving element 201 is shifted to the right against the resistance of the coil spring 202 until the conduit 205 is free to communicate with the conduit 208, i.e., the pump is then free to supply pressurized fluid to the conduit 208 and into the corresponding secondary adjusting unit for one of the pulleys forming part of the transmission. At the same time, the conduit 207 is free to communicate with the sump via conduit 206. The conduit 205 is further free to communicate with the radial channel 231 so that the pressure of fluid in the axial bore 230 rises and urges the axially reciprocable valving element 232 to bear against the stop 203. This, in turn, entails the development (in the bore 230) of a fluid force which urges the valving element 201 toward the chamber 210. The magnitude of such force is a function of fluid pressure in the bore 230 as well as of the cross-sectional area of this bore. At the same time, the fluid in the chamber 210 urges the valving element 201 in a direction to the right, and the magnitude of such force is proportional to the pressure of fluid in the conduit 207 as well as to the difference between the cross-sectional areas of portions 220, 221 of the valving element 201.

If the pressure in the conduit 207 is reduced to zero, the valving element 201 is acted upon only by a force which urges it toward the chamber 210, and this entails a pressure feedback.

If the pressure in chamber 210 is reduced so that the spring 202 can move the valving element 201 in a direction to the left, the valving element 201 establishes a path for the flow of fluid between the conduits 205 and 207, and such flow is controlled by a portion 233 of the valving element 201. At the same time, the valving element 201 establishes a path for the flow of fluid between the conduits 206 and 208. Thus, the fluid in the conduit 207 is pressurized but the pressure of fluid in the conduit 208 drops to zero. The valving element 201 is then acted upon by a force which urges it toward the coil spring 202, and the magnitude of such force is proportional to the difference between the cross-sectional areas of portions 220 and 221 of this valving element as well as to the pressure at the portion 233. At the same time, the valving element 201 is being acted upon by a force urging it in a direction toward the chamber 210, and such force is proportional to fluid pressure in the conduit 208 multiplied by the cross-sectional area of the bore 230. This results in the realization of a pressure feedback.

Figure 4:
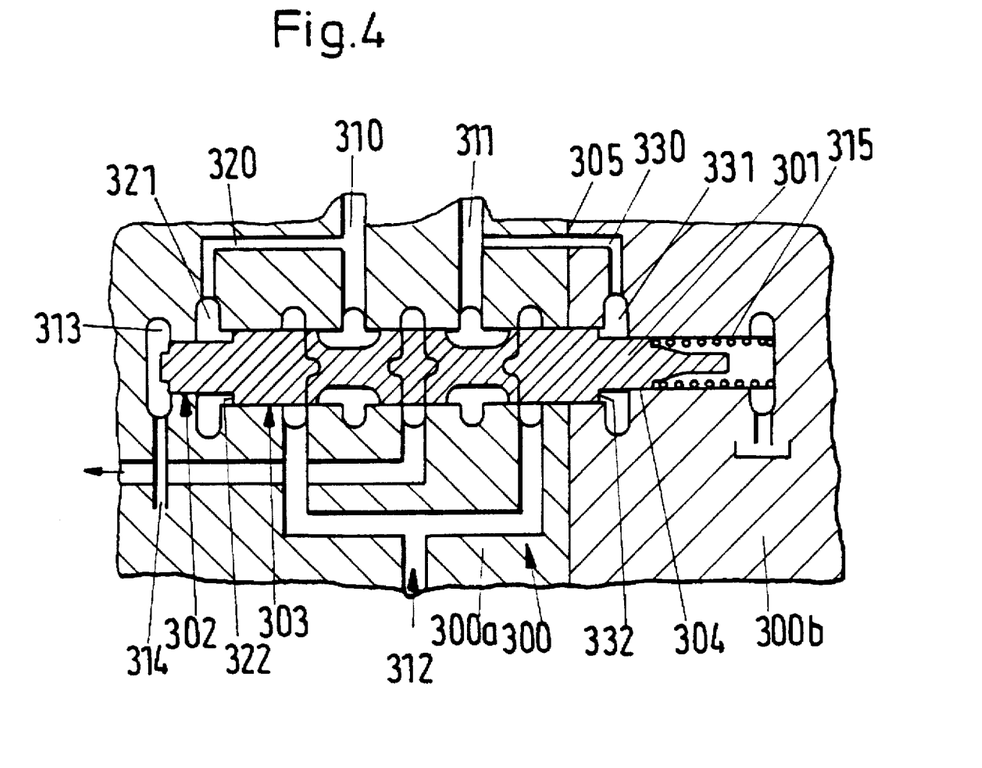
FIG. 4 is a schematic axial sectional view of a transmission ratio selecting valve constituting a modification of the valve shown in FIG. 3.

The transmission ratio selecting valve 300 of FIG. 4 constitutes a modification of the valve 200. The valve 300 comprises a housing for an axially reciprocable valving element or spool 301 having a smaller-diameter portion 302 adjacent a plenum chamber 313 and a larger-diameter portion 303, as well as a third portion 304 having a diameter smaller than that of the portion 303. The housing or body of the valve 300 comprises two sections 300a, 300b which are sealingly fitted to each other, as at 305. Such design of the housing renders it possible to insert the aforedescribed valving element 301.

A conduit 310 connects the valve 300 with the plenum chamber of one secondary or additional adjusting unit of the transmission (not shown), preferably with the secondary adjusting unit for the first pulley of such transmission. Another conduit 311 connects the valve with the secondary adjusting unit for the other pulley. If the pressure of a hydraulic fluid in the conduit 310 or 311 is increased, the axially movable disc of the respective pulley is caused to bear upon the adjacent portion of the chain of the infinitely variable speed ratio transmission with a corresponding force, all as already described with reference to the power train of FIG. 1.

A conduit 312 connects the valve 300 with a source, such as the pump 8 or 114, e.g., by way of a volumetric flow control valve corresponding to the valve 24 of FIG. 1. The aforementioned plenum chamber 313 at the left-hand axial end of the valving element 301 can receive pressurized fluid via conduit 314, e.g., from a proportioning valve corresponding to the valve 40 of FIG. 1. The right-hand end portion of the valving element 301 is biased toward the plenum chamber 313 by mechanical biasing means here shown as including or constituting a coil spring 315. That part of the housing section 300b which receives the spring 315 is not connectable with a source of pressurized hydraulic fluid, and the purpose of the spring 315 is to permanently urge the valving element 301 to a starting position.

A feedback conduit 320 connects the conduit 310 with a plenum chamber 321 which is provided in the housing section 300a adjacent the chamber 313. When the conduit 310 is free to communicate with the outlet of the pump through the conduit 312, the pressure in the plenum chamber 321 is increased by way of the feedback conduit 320 so that the fluid in the chamber 321 acts upon an annular shoulder 322 of the valving element 301 and urges the latter in a direction to the right, i.e., in a direction to stress the coil spring 315. The magnitude of the force which urges the valving element 301 in a direction to the right is proportional to the fluid pressure in the chamber 321 and to the area of the shoulder or surface 322.

The housing sections 300a, 300b jointly define a second feedback conduit or channel 330 which connects the conduit 311 with a plenum chamber 331 surrounding the portion 304 of the valving element 301. If the conduit 311 is free to communicate with the outlet of the pump via conduit 312, the pressure in the plenum chamber 331 rises by way of the feedback conduit 330 so that pressurized fluid filling the chamber 331 acts upon an annular shoulder or surface 332 between the portions 303, 304 of the valving element 301 and urges the latter in a direction toward the plenum chamber 313.

Figure 5A:
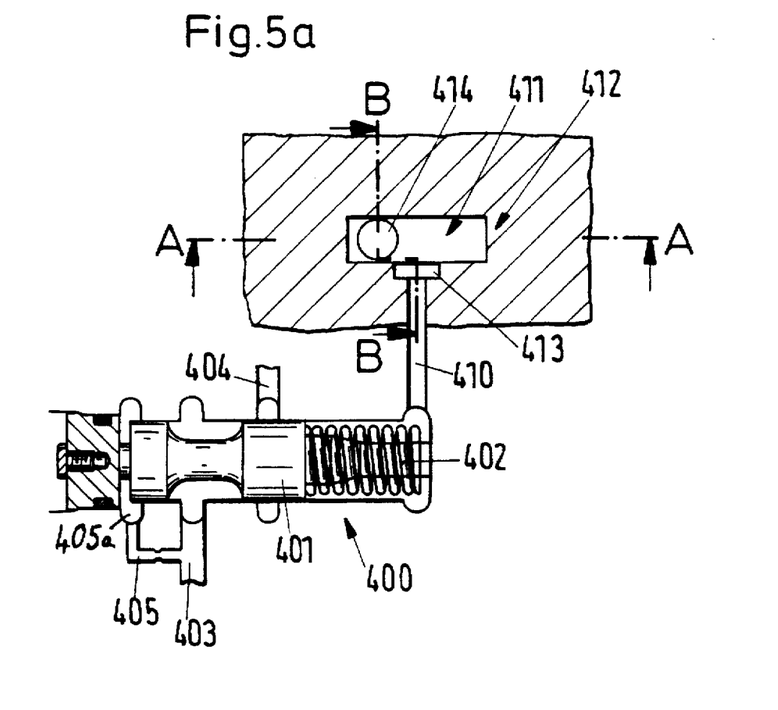
FIG. 5a is a schematic partially axial sectional view of a pressure regulating valve which can be utilized in the improved power train.
Figure 5B:
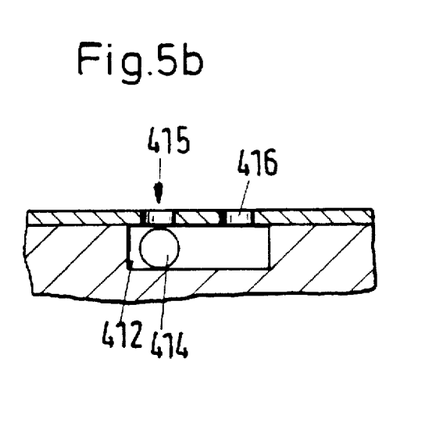
Figure 5C:
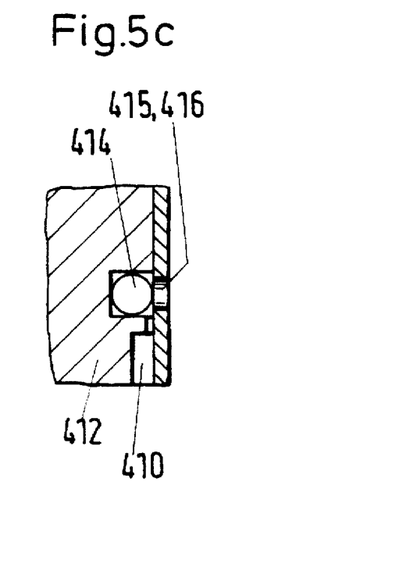

FIGS. 5a, 5b and 5c illustrate certain portions of a pressure regulating valve 400 which can replace the valve 25 in the power train of FIG. 1. The valve 400 comprises a valve housing or body for an axially reciprocable valving element or spool 401 and a mechanical biasing device in the form of a coil spring 402. A first conduit 403 (corresponding, for example, to the conduit 19 of FIG. 1) can supply pressurized fluid to a conduit 404 corresponding, for example, to the conduit 20 of FIG. 1, depending upon the axial position of the valving element 401.

A conduit 405 connects the conduit 403 (i.e., the outlet of the pump) with a plenum chamber 405a at the left-hand axial end of the valving element 401. The force with which the valving element 401 opposes dissipation of energy by the spring 402 depends upon the pressure of fluid in the plenum chamber 405a, i.e., upon the fluid pressure in the conduit 403. In other words, the force which is generated by the fluid in the chamber 405a opposes the tendency of the spring 402 to move the valving element 401 in a direction to the left, as viewed in FIG. 5a.

The pressure regulating valve 400 cooperates with a second valve 411 which constitutes an OR-member corresponding to the OR-member 28 in the power train of FIG. 1. The OR-member 411 comprises a valve body or housing 412 having two inlet ports 415, 416 (see FIGS. 5b and 5c) and an outlet port 413. The valving element of the OR-member 411 is a sphere 414 which is movable in the valve body 412 between a plurality of positions in one of which it seals the inlet port 415 and in the other of which it seals the inlet port 416.

If each of the inlet ports 415, 416 is connected to the source of pressurized fluid, the valving element 414 is moved toward a position of registry with the inlet port wherein the fluid pressure is lower than in the other inlet port. For example, and as shown in FIG. 5c, the valving element 414 seals the inlet port 415 when the pressure at the inlet port 416 is higher than at 415. At such time, pressurized fluid can flow from the inlet port 416 to the outlet port 413 and thence into the conduit 410. Inversely, the conduit 410 receives pressurized fluid from the inlet port 415 when the pressure of fluid at this port is higher than at the port 416. Thus, the valve 411 clearly acts as an OR-member.

The improved power train and its constituents can be modified in a number of additional ways. This applies not only for the transmission (such as the one shown in FIG. 1 and including the parts 1 through 7) but also for the various valves and groups of valves. By way of example only, the transmission ratio selecting valve 200 of FIG. 3 can be modified by selecting a different ratio of the radii (and hence of the cross-sectional areas) of portions 220, 221 of its valving element 201 and/or by selecting a different cross-sectional area for the axial passage 230 (and hence for the second valving element 232). Thus, the various diameters or radii or cross-sectional areas can be selected in such a way that the surfaces which are being acted upon by forces acting in opposite axial directions are identical or have different areas. It can be of advantage to select the areas of these surfaces in such a way that the surfaces which are effective within the main operating or driving range of the vehicle are smaller than those which are effective only within a relatively infrequently utilized range of operation of the vehicle. The quality of regulation is enhanced if the areas of the differential surfaces are relatively small so that it is advisable to rely on such surfaces for regulation or selection of the transmission ratio within the main operating range of the vehicle. The fact that the quality of regulation might be somewhat less satisfactory within the less frequently or infrequently utilized ranges of operation of the vehicle is of no consequence.

As already mentioned hereinbefore, the transmission ratio selecting valve or valves of the improved power train can constitute so-called 4/3-way valves. On the other hand, the pressure regulating valve can constitute a so-called two/two-way valve.

An infinitely variable speed ratio transmission similar to that shown in FIG. 1 is disclosed in commonly owned U.S. Pat. No. 5,169,365 granted Dec. 8, 1992 to Oswald Friedmann for "Power Train". The disclosure of this patent is incorporated herein by reference.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art and, therefore, such adaptations should and are intended to be comprehended within the meaning and range of equivalence of the appended claims.

What is claimed is:

1. A power train, particularly for use in motor vehicles, comprising an infinitely variable ratio transmission including an input portion having a first adjustable pulley, an output portion having a second adjustable pulley, an endless flexible torque transmitting element trained over said pulleys, and first and second primary adjusting units arranged to determine the extent of torque transmitting engagement between said flexible element and the respective pulleys, said primary adjusting units being actuatable by a fluid at a pressure which is variable at least as a function of torque to be transmitted by the transmission; means for generating said pressure including a hydromechanical torque sensor arranged to transmit at least a portion of torque to one of said input and output portions and including a plenum chamber arranged to receive pressurized fluid from a source and having an outlet, and a regulating valve for controlled evacuation of fluid from said plenum chamber by way of said outlet, said regulating valve having at least two components movable relative to each other in dependency upon the magnitude of torque being applied between said input and output portions to maintain the fluid in said plenum chamber at a pressure which is a function at least of the applied torque and which is transmittable to said adjusting units; transmission ratio changing means including an additional adjusting unit for at least one of said pulleys, said additional adjusting unit being arranged to operate in parallel with the respective primary adjusting unit and to receive fluid from said source; a ratio selecting valve connected between said source and said additional adjusting unit; and a pressure regulating valve connected between said source and said plenum chamber in parallel with said ratio selecting valve to influence the pressure of fluid at least at an inlet of said ratio selecting valve.

2. The power train of claim 1, wherein said source comprises a pump common to said torque sensor and to said additional adjusting unit.

3. The power train of claim 1, wherein the fluid pressure in said plenum chamber of said torque sensor is sufficient to effect a change of the transmission ratio at a predetermined speed under predetermined circumstances of operation of the power train, said pressure regulating valve being open under said predetermined circumstances.

4. The power train of claim 1, wherein the fluid pressure in said plenum chamber of said torque sensor is incapable of effecting a change of the transmission ratio at a predetermined speed under preselected circumstances of operation of the power train, said pressure regulating valve being at least partially closed under said preselected circumstances.

5. The power train of claim 4, wherein said pressure regulating valve is fully closed under said preselected circumstances.

6. The power train of claim 1, wherein said transmission ratio changing means includes an additional adjusting unit for each of said pulleys.

7. The power train of claim 1, wherein said pressure regulating valve has open and closed positions and the pressure of fluid at said inlet of said ratio selecting valve rises, in response to closing of said pressure regulating valve, above the pressure generated by said torque sensor.

8. The power train of claim 1, wherein the inlet of said ratio selecting valve is connected to said source and the ratio selecting valve further comprises an outlet connected with said additional adjusting unit, the fluid pressure at the inlet of said ratio selecting valve during a change of transmission ratio being higher than a maximum fluid pressure for said additional adjusting unit at the outlet of said ratio selecting valve.

9. The power train of claim 1, wherein said ratio selecting valve is a hydraulically regulatable valve.

10. The power train of claim 1, wherein said ratio selecting valve is regulatable by a proportioning valve.

11. The power train of claim 1, wherein said pressure regulating valve is operative to maintain the fluid pressure at the inlet of said ratio selecting valve above a predetermined minimum value.

12. The power train of claim 1, wherein said pressure regulating valve includes a valving element axially reciprocable in a valve body back and forth in first and second directions, and means for at least mechanically biasing said valving element in one of said first and second directions, said valving element being movable in the other of said first and second directions by fluid under a pressure corresponding to that between said source, said inlet of said ratio selecting valve and an inlet of said pressure regulating valve.

13. The power train of claim 12, wherein said valving element is biased in said one direction by a fluid pressure dependent force acting in parallel with the mechanical bias in said one direction.

14. The power train of claim 13, wherein said force is dependent upon at least one fluid pressure which is established between said ratio selecting valve and a transmission ratio varying adjusting element.

15. The power train of claim 1, wherein said transmission ratio changing means comprises an additional adjusting unit for each of said pulleys and conduits connecting said source with said additional adjusting units, and further comprising an OR-member arranged to apply fluid pressure prevailing in both said conduits to actuate said pressure regulating valve.

16. The power train of claim 15, wherein said OR-member is operative to exert upon a reciprocable valving element of said pressure regulating valve a force acting in parallel with a force generated by an energy storing device in a direction to close said pressure regulating valve.

17. The power train of claim 15, wherein said OR-member includes a further valve having a valve body defining two inlets and an outlet, and a substantially spherical valving element confined in said valve body and arranged to seal one of said two inlets when the pressure of fluid at said one of said two inlets is less than the pressure of fluid at the other of said two inlets.

18. The power train of claim 16, wherein said OR-member comprises a valve having a substantially spherical mobile valving element.

19. The power train of claim 15, wherein said OR-member comprises a valve including a mobile valving element and two compartments flanking said valving element, said primary adjusting units having plenum chambers each in communication with a different one of said compartments.

20. The power train of claim 19, wherein said valving element includes a reciprocable plunger.

21. The power train of claim 1, wherein said ratio selecting valve comprises a 4/3-way valve.

22. The power train of claim 1, wherein said ratio selecting valve comprises a plurality of discrete valves.

23. The power train of claim 22, wherein said ratio selecting valve comprises two valves.

24. The power train of claim 22, further comprising common regulating means for said plurality of discrete valves.

25. The power train of claim 22, wherein said transmission ratio changing means comprises an additional adjusting unit for each of said pulleys and the fluid pressure in each of said additional adjusting units is regulatable by a discrete valve of said plurality of discrete valves forming part of said ratio selecting valve.

26. The power train of claim 25, wherein at least one of said plurality of discrete valves is a feedback valve.

27. The power train of claim 25, wherein at least one of said plurality of discrete valves includes a pressure reducing feedback valve.

28. The power train of claim 1, wherein said ratio selecting valve comprises a valve body and a valving element axially reciprocable in said valve body in first and second directions between a plurality of positions and including portions having different radii and being spaced apart from each other in an axial direction of said valve body, and mechanical means for biasing said valving element in one of said first and second directions, said portions of said valving element being arranged to be acted upon by fluid-generated axial forces in addition to the bias of said mechanical means.

29. The power train of claim 28, wherein said valving element has at least two shoulders disposed between said portions of different radii and having different areas, said shoulders facing in opposite axial directions and being arranged to be acted upon by hydraulic forces of different magnitude.

30. The power train of claim 28, wherein said valving element includes a portion at which the radius of the valving element is changed as a result of the provision of a shoulder adapted to be acted upon by fluid pressure in the axial direction of said valving element, said valving element having a fluid-containing axial passage for a second reciprocable valving element and the fluid pressure in said passage upon said axially reciprocable valving element being proportional to a cross-sectional area of said passage.

31. The power train of claim 30, wherein said axially reciprocable valving element has a first axial length and said passage has a second axial length less than said first axial length.

32. The power train of claim 30, wherein said fluid pressure acts upon said axially reciprocable valving element in said first direction and said fluid-generated axial forces act upon said axially reciprocable valving element in said second direction.

33. The power train of claim 1, wherein said pressure regulating valve includes a 2/2-way valve.

34. The power train of claim 1, wherein said torque sensor is operative to transmit the entire torque to one of said input and output portions.

35. A power train, particularly for use in motor vehicles, comprising a variable speed ratio transmission; and means for varying the ratio of said transmission, including a ratio selecting valve having a valve body and a valving element axially reciprocable in said valve body in first and second directions between a plurality of positions and including portions having different radii and being spaced apart from each other in an axial direction of said valve body, and mechanical means for biasing said valving element in one of said first and second directions, said portions of said valving element being arranged to be acted upon by fluid-generated axial forces in addition to the bias of said mechanical means.

36. The power train of claim 35, wherein said valving element has at least two shoulders disposed between said portions of different radii and having different areas, said shoulders facing in opposite axial directions and being arranged to be acted upon by hydraulic forces of different magnitude.

37. The power train of claim 35, wherein said valving element includes a portion at which the radius of the valving element is changed as a result of the provision of a shoulder adapted to be acted upon by fluid pressure in the axial direction of said valving element, said valving element having a fluid-containing axial passage for a second reciprocable valving element and the fluid pressure in said passage upon said axially reciprocable valving element being proportional to a cross-sectional area of said passage.

38. The power train of claim 37, wherein said axially reciprocable valving element has a first axial length and said passage has a second axial length less than said first axial length.

39. The power train of claim 37, wherein said fluid pressure acts upon said axially reciprocable valving element in said first direction and said axially reciprocable valving element is acted upon by fluid-generated axial forces in said second direction.

* * * * *